US006851041B2

(12) United States Patent
Pechanek et al.

(10) Patent No.: US 6,851,041 B2
(45) Date of Patent: *Feb. 1, 2005

(54) METHODS AND APPARATUS FOR DYNAMIC VERY LONG INSTRUCTION WORD SUB-INSTRUCTION SELECTION FOR EXECUTION TIME PARALLELISM IN AN INDIRECT VERY LONG INSTRUCTION WORD PROCESSOR

(75) Inventors: Gerald G. Pechanek, Cary, NC (US); Juan Guillermo Revilla, Austin, TX (US); Edwin Franklin Barry, Vilas, NC (US)

(73) Assignee: PTS Corporation, San Jose, CA (US)

( * ) Notice: Subject to any disclaimer, the term of this patent is extended or adjusted under 35 U.S.C. 154(b) by 33 days.

This patent is subject to a terminal disclaimer.

(21) Appl. No.: 10/254,012

(22) Filed: Sep. 24, 2002

(65) Prior Publication Data

US 2003/0079109 A1 Apr. 24, 2003

Related U.S. Application Data

(63) Continuation of application No. 09/717,992, filed on Nov. 21, 2000, now Pat. No. 6,467,036, which is a continuation of application No. 09/205,588, filed on Dec. 4, 1998, now Pat. No. 6,173,389.
(60) Provisional application No. 60/067,511, filed on Dec. 4, 1997.

(51) Int. Cl.[7] .............................................. G06F 15/80
(52) U.S. Cl. ......................................... 712/24; 711/220
(58) Field of Search ............................... 712/10, 20, 21, 712/22, 24, 200, 203, 208, 210, 212, 215, 226, 12; 711/220

(56) References Cited

U.S. PATENT DOCUMENTS 6,173,389 B1 * 1/2001 Pechanek et al. ............. 712/24
6,467,036 B1 * 10/2002 Pechanek et al. ............. 712/24

* cited by examiner

Primary Examiner—William M. Treat
(74) Attorney, Agent, or Firm—Priest & Goldstein, PLLC

(57) ABSTRACT

A pipelined data processing unit includes an instruction sequencer and n functional units capable of executing n operations in parallel. The instruction sequencer includes a random access memory for storing very-long-instruction-words (VLIWs) used in operations involving the execution of two or more functional units in parallel. Each VLIW comprises a plurality of short-instruction-words (SIWs) where each SIW corresponds to a unique type of instruction associated with a unique functional unit. VLIWs are composed in the VLIW memory by loading and concatenating SIWs in each address, or entry. VLIWs are executed via the execute-VLIW (XV) instruction. The iVLIWs can be compressed at a VLIW memory address by use of a mask field contained within the XV1 instruction which specifies which functional units are enabled, or disabled, during the execution of the VLIW. The mask can be changed each time the XV1 instruction is executed, effectively modifying the VLIW every time it is executed. The VLIW memory (VIM) can be further partitioned into separate memories each associated with a function decode-and-execute unit. With a second execute VLIW instruction XV2, each functional unit's VIM can be independently addressed thereby removing duplicate SIWs within the functional unit's VIM. This provides a further optimization of the VLIW storage thereby allowing the use of smaller VLIW memories in cost sensitive applications.

27 Claims, 13 Drawing Sheets

FIG. 1

$$[a_3, a_2, a_1, a_0] \times \begin{bmatrix} b_{03}, & b_{02}, & b_{01}, & b_{00} \\ b_{13}, & b_{12}, & b_{11}, & b_{10} \\ b_{23}, & b_{22}, & b_{21}, & b_{20} \\ b_{33}, & b_{32}, & b_{31}, & b_{30} \end{bmatrix}$$

FIG. 2
(PRIOR ART)

| VLIW MEMORY ADDRESS | INSTR. TYPES | STORE | LOAD | ALU | MAU | INSTRUCTION EXECUTION CYCLES |
|---|---|---|---|---|---|---|
| n/a | SIW | | LOAD R0, $b_{00}$ | | | 1 |
| 1 | VLIW | | LOAD R1, $b_{10}$ | | Mpy R5, R0, R20 | 2 |
| 2 | VLIW | | LOAD R0, $b_{20}$ | | Mpy R6, R1, R21 | 3 |
| 3 | VLIW | | LOAD R1, $b_{30}$ | ADD R9, R5, R6 | Mpy R5, R0, R22 | 4 |
| 4 | VLIW | | LOAD R0, $b_{01}$ | ADD R9, R9, R5 | Mpy R6, R1, R23 | 5 |
| 5 | VLIW | | LOAD R1, $b_{11}$ | ADD R9, R9, R6 | Mpy R5, R0, R20 | 6 |
| 6 | VLIW | STORE RESULT R9 | LOAD R0, $b_{21}$ | | Mpy R6, R1, R21 | 7 |
| 3 | VLIW | | LOAD R1, $b_{31}$ | ADD R9, R5, R6 | Mpy R5, R0, R22 | 8 |
| 4 | VLIW | | LOAD R0, $b_{02}$ | ADD R9, R9, R5 | Mpy R6, R1, R23 | 9 |
| 5 | VLIW | | LOAD R1, $b_{12}$ | ADD R9, R9, R6 | Mpy R5, R0, R20 | 10 |
| 6 | VLIW | STORE RESULT R9 | LOAD R0, $b_{22}$ | | Mpy R6, R1, R21 | 11 |
| 3 | VLIW | | LOAD R1, $b_{32}$ | ADD R9, R5, R6 | Mpy R5, R0, R22 | 12 |
| 4 | VLIW | | LOAD R0, $b_{03}$ | ADD R9, R9, R5 | Mpy R6, R1, R23 | 13 |
| 5 | VLIW | | LOAD R1, $b_{13}$ | ADD R9, R9, R6 | Mpy R5, R0, R20 | 14 |
| 6 | VLIW | STORE RESULT R9 | LOAD R0, $b_{23}$ | | Mpy R6, R1, R21 | 15 |
| 3 | VLIW | | LOAD R1, $b_{33}$ | ADD R9, R5, R6 | Mpy R5, R0, R22 | 16 |
| 7 | VLIW | | | ADD R9, R9, R5 | Mpy R6, R1, R23 | 17 |
| n/a | SIW | | | ADD R9, R9, R6 | | 18 |
| n/a | SIW | STORE RESULT R9 | | | | 19 |

FIG. 4B

XV1-EXECUTE VLIW ENCODING —425

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | | S/P | | Ctrl0p | | | VX | | UAF | | 0 | 0 | 0 | 0 | 0 | 0 | 0 | SU | LU | ALU | MAU | | DSU | | Vb | 0 | VimOffs | | | |

430 ..... 431

SYNTAX/OPERATION —435

| INSTRUCTION | OPERANDS | OPERATION |
|---|---|---|
| XV1.[SP] | V[01], VIMOFFS, E={SLAMD}, F={AMDN} | EXECUTE (V[01]+VIMOFFS)[SU] if (E=S)<br>EXECUTE (V[01]+VIMOFFS)[LU] if (E=L)<br>EXECUTE (V[01]+VIMOFFS)[ALU] if (E=A)<br>EXECUTE (V[01]+VIMOFFS)[MAU] if (E=M)<br>EXECUTE (V[01]+VIMOFFS)[DSU] if (E=D)<br><br>(V[01]+VIMOFFS)[UAF]←ALU if (F=- or F=A)<br>(V[01]+VIMOFFS)[UAF]←MAU if (F=M)<br>(V[01]+VIMOFFS)[UAF]←DSU if (F=D) |

FIG. 4C

LV2-LOAD/MODIFY VLIW-2 ENCODING — 455

450

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | | CtrlOp | | | | 0 | LI | d | | InstrCnt | | | | UnitVIM | | | 0 | 0 | 0 | 0 | 0 | Vb | 0 | VimOffs | | | | | |

SYNTAX/OPERATION — 460

| INSTRUC-TION | OPERANDS | OPERATION |
|---|---|---|
| LV2.[SP] | LI, u=UnitVIM, V[01], VIMOFFS, InstrCnt, d | IF (LI=0) LOAD DISABLE BIT ONLY<br>DISABLE BIT @(V[01]+VIMOFFS)[UnitVIM]←d<br><br>IF (LI=1) LOAD INSTRUCTIONS<br>DISABLE BIT @(V[01]+VIMOFFS)[UnitVIM]←d<br><br>LOAD NEXT InstrCnt INSTRUCTIONS INTO<br>(V[01]+VIMOFFS)[UnitVIM]←1st INSTRUCTION FOLLOWING LV2<br>(V[01]+VIMOFFS+1)[UnitVIM]←2nd INSTRUCTION FOLLOWING LV2<br>⋮<br>(V[01]+VIMOFFS+InstrCnt)[UnitVIM]   (InstrCnt)$^{th}$ INSTRUCTION FOLLOWING LV2<br><br>InstrCnt IS A BINARY CODED NUMBER, 0 THRU F, THAT REPRESENTS FROM 1 TO 16 INSTRUCTIONS THAT CAN BE LOADED INTO UP TO 16 CONSECUTIVE UnitVIM LOCATIONS |

FIG. 4D

XV2-EXECUTE VLIW ENCODING ⟵475       470

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | CtrlOp | | | | | UAF | | | 0 | 0 | Vb | SOFS | | | | LOFS | | | | | AOFS | | | | | MOFS | | | DOFS |

SYNTAX/OPERATION  ⟵480

| INSTRUCTION | OPERANDS | OPERATION |
|---|---|---|
| XV2.[SP] | V[01], SOFFS, LOFS, AOFS, MOFS, DOFS, F=[AMDN] | EXECUTE (V[01]+SOFFS)[SU] IF (d=0)<br>EXECUTE (V[01]+LOFFS)[LU] IF (d=0)<br>EXECUTE (V[01]+AOFFS)[ALU] IF (d=0)<br>EXECUTE (V[01]+MOFFS)[MAU] IF (d=0)<br>EXECUTE (V[01]+DOFFS)[DSU] IF (d=0)<br><br>EXECUTE NOP @ (V[01]+unitOFS)[unit] IF (d=1) |

FIG. 6

| VIM ADDRESS | INSTR. TYPES | STORE | LOAD | ALU | MAU | |
|---|---|---|---|---|---|---|
| 0 | iVLIW | STORE RESULT R9 | LOAD R0, $b_{00}$ | | Mpy R6, R1, R21 | 1 |
| 1 | iVLIW | | LOAD R1, $b_{10}$ | ADD R9, R9, R6 | Mpy R5, R0, R20 | 2 |
| 0 | iVLIW | STORE RESULT R9 | LOAD R0, $b_{20}$ | | Mpy R6, R1, R21 | 3 |
| 2 | iVLIW | | LOAD R1, $b_{30}$ | ADD R9, R5, R6 | Mpy R5, R0, R22 | 4 |
| 3 | iVLIW | | LOAD R0, $b_{01}$ | ADD R9, R9, R5 | Mpy R6, R1, R23 | 5 |
| 1 | iVLIW | | LOAD R1, $b_{11}$ | ADD R9, R9, R6 | Mpy R5, R0, R20 | 6 |
| 0 | iVLIW | STORE RESULT R9 | LOAD R0, $b_{21}$ | | Mpy R6, R1, R21 | 7 |
| 2 | iVLIW | | LOAD R1, $b_{31}$ | ADD R9, R5, R6 | Mpy R5, R0, R22 | 8 |
| 3 | iVLIW | | LOAD R0, $b_{02}$ | ADD R9, R9, R5 | Mpy R6, R1, R23 | 9 |
| 1 | iVLIW | | LOAD R1, $b_{12}$ | ADD R9, R9, R6 | Mpy R5, R0, R20 | 10 |
| 0 | iVLIW | STORE RESULT R9 | LOAD R0, $b_{22}$ | | Mpy R6, R1, R21 | 11 |
| 2 | iVLIW | | LOAD R1, $b_{32}$ | ADD R9, R5, R6 | Mpy R5, R0, R22 | 12 |
| 3 | iVLIW | | LOAD R0, $b_{03}$ | ADD R9, R9, R5 | Mpy R6, R1, R23 | 13 |
| 1 | iVLIW | | LOAD R1, $b_{13}$ | ADD R9, R9, R6 | Mpy R5, R0, R20 | 14 |
| 0 | iVLIW | STORE RESULT R9 | LOAD R0, $b_{23}$ | | Mpy R6, R1, R21 | 15 |
| 2 | iVLIW | | LOAD R1, $b_{33}$ | ADD R9, R5, R6 | Mpy R5, R0, R22 | 16 |
| 3 | iVLIW | | LOAD R0, Data+ | ADD R9, R9, R5 | Mpy R6, R1, R23 | 17 |
| 1 | iVLIW | | LOAD R1, Data+ | ADD R9, R9, R6 | Mpy R5, R0, R20 | 18 |
| 0 | iVLIW | STORE RESULT R9 | LOAD R0, Data+ | | Mpy R6, R1, R21 | 19 |

= THIS SYMBOL INDICATES THE INSTRUCTION SLOT WITHIN THE iVLIW IS DYNAMICALLY MASKED OFF DURING XV EXECUTION

XV1 EXAMPLE PROGRAM CODE:

|    |           | PROGRAM                    |     | ** COMMENTS          |
|----|-----------|----------------------------|-----|----------------------|
| 1. |           | XV1 V0, VIMOFS=0, E=L, F=A | **  | LOAD                 |
| 2. |           | XV1 V0, VIMOFS=1, E=LM, F=A | ** | LOAD,       Mpy      |
| 3. |           | XV1 V0, VIMOFS=0, E=LM, F=A | ** | LOAD,       Mpy      |
| 4. | LOOPSTART | XV1 V0, VIMOFS=2, E=LAM, F=A | ** | LOAD, ADD, Mpy     |
| 5. |           | XV1 V0, VIMOFS=3, E=LAM, F=A | ** | LOAD, ADD, Mpy     |
| 6. |           | XV1 V0, VIMOFS=1, E=LAM, F=A | ** | LOAD, ADD, Mpy     |
| 7. | LOOPEND   | XV1 V0, VIMOFS=0, E=SLM, F=A | ** STORE, LOAD,    Mpy |
| 8. |           | XV1 V0, VIMOFS=2, E=LAM, F=A | ** | LOAD, ADD, Mpy     |
| 9. |           | XV1 V0, VIMOFS=3, E=AM, F=A | **  |       ADD, Mpy       |
| 10.|           | XV1 V0, VIMOFS=1, E=A, F=A | **  |       ADD            |
| 11.|           | XV1 V0, VIMOFS=0, E=S, F=A | **  STORE               |

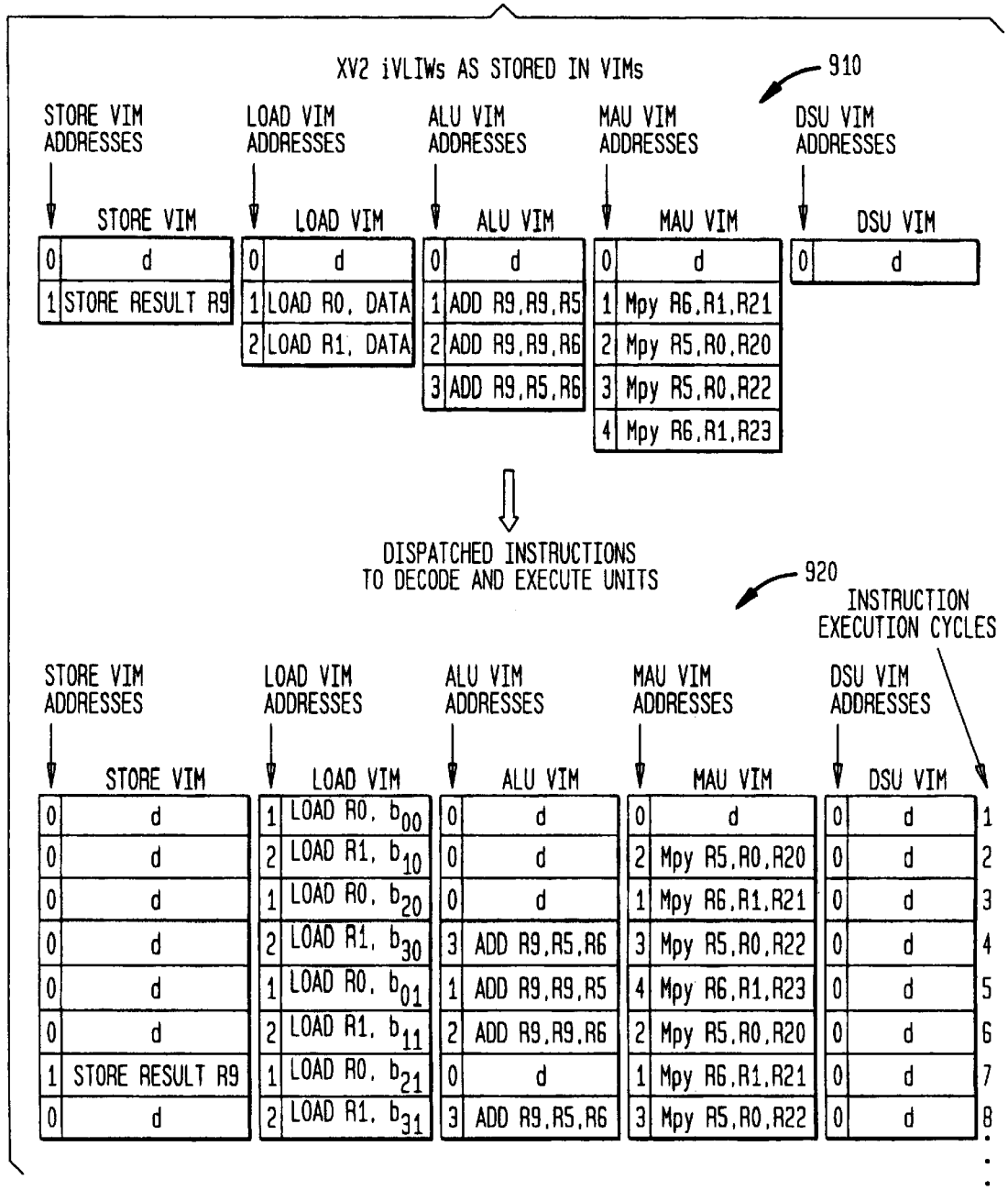

FIG. 10

XV2 EXAMPLE PROGRAM CODE:

|  |  | PROGRAM |  | ** COMMENTS |
|---|---|---|---|---|
| 1. |  | XV2 V0, S=0, L=1, A=0, M=0, D=0, F=A ** | | LOAD |
| 2. |  | XV2 V0, S=0, L=2, A=0, M=2, D=0, F=A ** | | LOAD, Mpy |
| 3. |  | XV2 V0, S=0, L=1, A=0, M=1, D=0, F=A ** | | LOAD, Mpy |
| 4. | LOOPSTART | XV2 V0, S=0, L=2, A=3, M=3, D=0, F=A ** | | LOAD, ADD, Mpy |
| 5. |  | XV2 V0, S=0, L=1, A=1, M=4, D=0, F=A ** | | LOAD, ADD, Mpy |
| 6. |  | XV2 V0, S=0, L=2, A=2, M=2, D=0, F=A ** | | LOAD, ADD, Mpy |
| 7. | LOOPEND | XV2 V0, S=1, L=1, A=0, M=1, D=0, F=A ** | STORE, | LOAD, Mpy |
| 8. |  | XV2 V0, S=0, L=2, A=3, M=3, D=0, F=A ** | | LOAD, ADD, Mpy |
| 9. |  | XV2 V0, S=0, L=0, A=1, M=4, D=0, F=A ** | | ADD, Mpy |
| 10. |  | XV2 V0, S=0, L=0, A=2, M=0, D=0, F=A ** | | ADD |
| 11. |  | XV2 V0, S=1, L=0, A=0, M=0, D=0, F=A ** | STORE | |

— 1000

US 6,851,041 B2

METHODS AND APPARATUS FOR DYNAMIC VERY LONG INSTRUCTION WORD SUB-INSTRUCTION SELECTION FOR EXECUTION TIME PARALLELISM IN AN INDIRECT VERY LONG INSTRUCTION WORD PROCESSOR

RELATED APPLICATIONS

This is a continuation of application Ser. No. 09/717,992 filed on Nov. 21, 2000, now U.S. Pat. No. 6,467,036, which is a continuation of application Ser. No. 09/205,588 filed on Dec. 4, 1998, now U.S. Pat. No. 6,173,389, which claims the benefit of U.S. Provisional Application Ser. No. 60/067,511 filed Dec. 4, 1997, each of which is incorporated by reference herein in its entirety.

The present invention claims the benefit of U.S. Provisional Application Ser. No. 60/067,511 entitled "Method and Apparatus For Dynamically Modifying Instructions in a Very Long Instruction Word Processor" and filed Dec. 4, 1997.

FIELD OF THE INVENTION

The present invention relates generally to improvements in parallel processing, and more particularly to advantageous techniques for providing dynamic very long instruction word (VLIW) sub-instruction selection for execution time parallelism in an indirect VLIW processor.

BACKGROUND OF THE INVENTION

In a VLIW processor, a typical problem is that it is difficult to make effective use of the full capabilities of the fixed length VLIWs available in the hardware. In previous designs, this design problem led to a very porous VLIW memory containing many No Operation (NOP) instructions within the VLIWs. Some machines have attempted to encode the NOPs to more fully utilize the VLIW memory space. One motivation of such attempts was to make better use of the costly VLIW memory included in these earlier processors. The encoded NOPs were typically assigned to each specific VLIW with no reuse of the VLIW possible in different areas of the program.

There are other needs to be met by a VLIW parallel data processor. For example, it is desirable to pipeline operations in order to achieve a steady state flow of data for maximum throughput. Consider the case of matrix multiplication using a VLIW architecture with four short instruction words (SIWs) per VLIW. In the example of FIG. 1, a 4-element vector 2 and a 4×4 matrix 4 are multiplied. Given a processor with operands stored in a register file and VLIW execution units that operate on register file source data operands and deliver result data to the register file, it can be reasonably assumed that the vector elements are stored in data registers $R20=a_0$, $R21=a_1$, $R22=a_2$, and $R23=a_3$, and the 4×4 matrix 4 is stored in a processor accessible memory. FIG. 2 illustrates how the entire operation is handled in a typical prior art approach. Each row in table 10 represents a unique short instruction word (SIW) or VLIW instruction with the program flow beginning at the top of the table and proceeding time-wise down the page. The Load operation is an indexed load that incrementally addresses memory to fetch the data element listed and load it into the specified register R0 or R1. The Add and Mpy instructions provide the function Rtarget=Rx Operation Ry, where Rtarget is the operand register closest to the function name and the source operands Rx and Ry are the second and third register specified. Each unique VLIW memory address is identified with a number in the first column. The table 10 of FIG. 2 shows that a minimum of seven VLIWs, each stored in a unique VLIW memory address, and three unique SIWs, are required to achieve the desired results in the prior art. It is important to note that of the seven VLIWs, three VLIWs, namely numbers 1, 2, and 7, use only two SIWs per VLIW, the other four use three SIWs per VLIW. When a four instruction slot VLIW contains only two SIWs, the other two slots contain NOP instructions. When the four instruction slot VLIW contains three SIWs, the other slot contains a single NOP. With a five instruction slot VLIW as will be described in greater detail below, even poorer usage of the VLIW memory results using prior art techniques. In the vector matrix example, a five slot VLIW will use 7*5=35 VLIW memory locations with 17 NOPs assuming the fifth slot is not used for this matrix multiplication example. The prior art approach results in a very porous VLIW memory with numerous NOP instructions.

It is desirable to reduce the number of unique VLIW memory addresses to accomplish the same task since this makes more efficient use of the available hardware. It is also desirable to reduce duplicate instructions in the VLIW memory storage. This is an important consideration that allows a smaller VLIW memory to be designed into a processor thereby minimizing its cost. Further, if the same VLIW memory address could be shared by multiple sections of code and even multiple programs then the latency cost of loading the VLIW memories can be minimized, as compared to prior art approaches, and amortized over the multiple programs thereby improving overall performance. In addition, it is desirable to extend this concept into multiple Processing Elements (PEs) and to a controller Sequence Processor (SP) of a Single Instruction Multiple Data stream (SIMD) machine

SUMMARY OF THE PRESENT INVENTION

The present invention is preferably used in conjunction with the ManArray architecture various aspects of which are described in greater detail in U.S. patent application Ser. No. 08/885,310 filed Jun. 30, 1997, U.S. patent application Ser. No. 08/949,122 filed Oct. 10, 1997, U.S. patent application Ser. No. 09/169,255 filed Oct. 9, 1998, U.S. patent application Ser. No. 09/169,256 filed Oct. 9, 1998, U.S. patent application Ser. No. 09/169,072 filed Oct. 9, 1998, and U.S. patent application Ser. No. 09/187,539 filed Nov. 6, 1998, Provisional Application Ser. No. 60/068,021 entitled "Methods and Apparatus for Scalable Instruction Set Architecture" filed Dec. 18, 1997, Provisional Application Ser. No. 60/071,248 entitled "Methods and Apparatus to Dynamically Expand the Instruction Pipeline of a Very Long Instruction Word Processor" filed Jan. 12, 1998, Provisional Application Ser. No. 60/072,915 entitled "Methods and Apparatus to Support Conditional Execution in a VLIW-Based Array Processor with Subword Execution" filed Jan. 28, 1988, Provisional Application Ser. No. 60/077,766 entitled "Register File Indexing Methods and Apparatus for Providing Indirect Control of Register in a VLIW Processor" filed Mar. 12, 1998, Provisional Application Ser. No. 60/092,130 entitled "Methods and Apparatus for Instruction Addressing in Indirect VLIW Processors" filed Jul. 9, 1998, Provisional Application Ser. No. 60/103,712 entitled "Efficient Complex Multiplication and Fast Fourier Transform (FFT) Implementation on the ManArray" filed Oct. 9, 1998, and Provisional Application Ser. No. 60/106,867 entitled "Methods and Apparatus for Improved Motion Estimation for Video Encoding" filed Nov. 3, 1998, respectively, and incorporated herein in their entirety.

The present invention addresses the need to provide a compressed VLIW memory and the ability to reuse instruction components of VLIWs in a highly advantageous way. In one aspect, the present invention comprises a SIW fetch controller for reading instructions from the SIW memory (SIM), a VLIW memory (VIM) to store composed VLIWs at specified addresses, a VLIW controller for indirectly loading and reading instructions from the VIM, and instruction decode and execution units. VLIWs in the present invention are composed by loading and concatenating multiple SIWs in a VIM address prior to their execution.

In a SIMD machine, the SIW fetch controller resides in the SIMD array controller SP which dispatches the fetched 32-bit instructions to the array PEs. The SP and the PEs include a VIM, a VIM controller, and instruction and decode execution units. The concepts discussed in this disclosure apply to both the indirect VLIW (iVLIW) apparatus and mechanism located in the SP controller and each PE in a multiple PE array SIMD machine.

After at least one VLIW is loaded into VIM, it may be selected by an execute-VLIW (XV) instruction. There are two types of XV instructions described in this invention. The first one XV1 provides sub-VLIW SIW selection across the slots at the same VIM address for execution time parallelism. The second XV2 provides sub-VLIW SIW selection with independently selectable SIWs from the available SIWs within each of the slots VIM sections for execution time parallelism. The XV1 instruction is described first with an example demonstrating the advantages of this approach. The XV2 instruction description follows with an example demonstrating its inherent advantages.

The XV1 instruction causes the stored VLIW to be read out indirectly based upon address information that is computed from a VIM base address register and an immediate Offset value that is present in the XV1 instruction. The XV1 instruction contains Mask-Enable-bits which select the instructions from the read-out VLIW that are to be scheduled for execution. In a preferred ManArray embodiment there are 8-bit Mask-Enable-bits, one bit per execution unit, supporting up to 8-SIWs in a single VLIW. For the first implementation, 5 SIWs are preferably used.

Due to the use of a VIM base register, Vb, unlimited VIM storage is possible. For each Vb base address, the XV1 instruction preferably supports, in the first implementation, an 8-bit offset thereby allowing 256 VLIWs per Vb address. The preferred ManArray architecture specifies that up to 8 SIWs can be stored per VIM address and a minimum of eight Mask-Enable-bits, one per slot, are supported by the preferred embodiment. Also, because each VIM entry has a unique address, each VIM entry can be loaded, modified, executed, or disabled, independently.

With eight SIW slots available per VIM entry, up to 255 unique combinations of SIW types can be stored in each entry, where, for example, SIW instruction types can include Store, Load, Arithmetic Logic Unit (ALU), Multiply Accumulate Unit (MAU), and Data Select Unit (DSU) instruction types. Each combination represents a unique indirect VLIW (iVLIW) available for XV1 execution. Furthermore, when invoking the execution of SIWs from a previously loaded VIM entry via the XV1 containing the 8-bit mask, up to 255 unique iVLIW operations can be invoked from that VIM entry alone.

The XV2 instruction provides the capability to remove duplicate instructions within groups of VLIWs within a slot specific section of the VIM. This capability provides optimum packing of instructions within the VIM thereby further optimizing its efficiency and minimizing its size for specific applications.

A more complete understanding of the present invention, as well as other features and advantages of the invention will be apparent from the following Detailed Description and the accompanying drawings.

BRIEF DESCRIPTION OF THE DRAWINGS

FIG. 1 illustrates the multiplication of a vector by a matrix;

FIG. 2 illustrates a prior art approach to the multiplication operation of FIG. 1;

FIG. 4B illustrates a presently preferred XV1, execute VLIW, instruction and syntax/operation details therefor;

FIG. 4C illustrates a presently preferred LV2, load/modify VLIW-2, instruction and syntax/operation details therefor;

FIG. 4D illustrates a presently preferred XV2, execute VLIW, instruction and syntax/operation details therefor;

FIG. 6 illustrates the approach of the present invention applied to the multiplication operation of FIG. 1;

FIG. 7A illustrates program code using XV1 instructions for the multiplication operation of FIG. 1;

FIG. 9 illustrates dynamic cycle-by-cycle iVLIW instruction selection with within slot compression for execution time parallelism; and FIG. 10 illustrates program code using XV2 instructions for the multiplication operation of FIG. 1.

DETAILED DESCRIPTION

Figure 3:
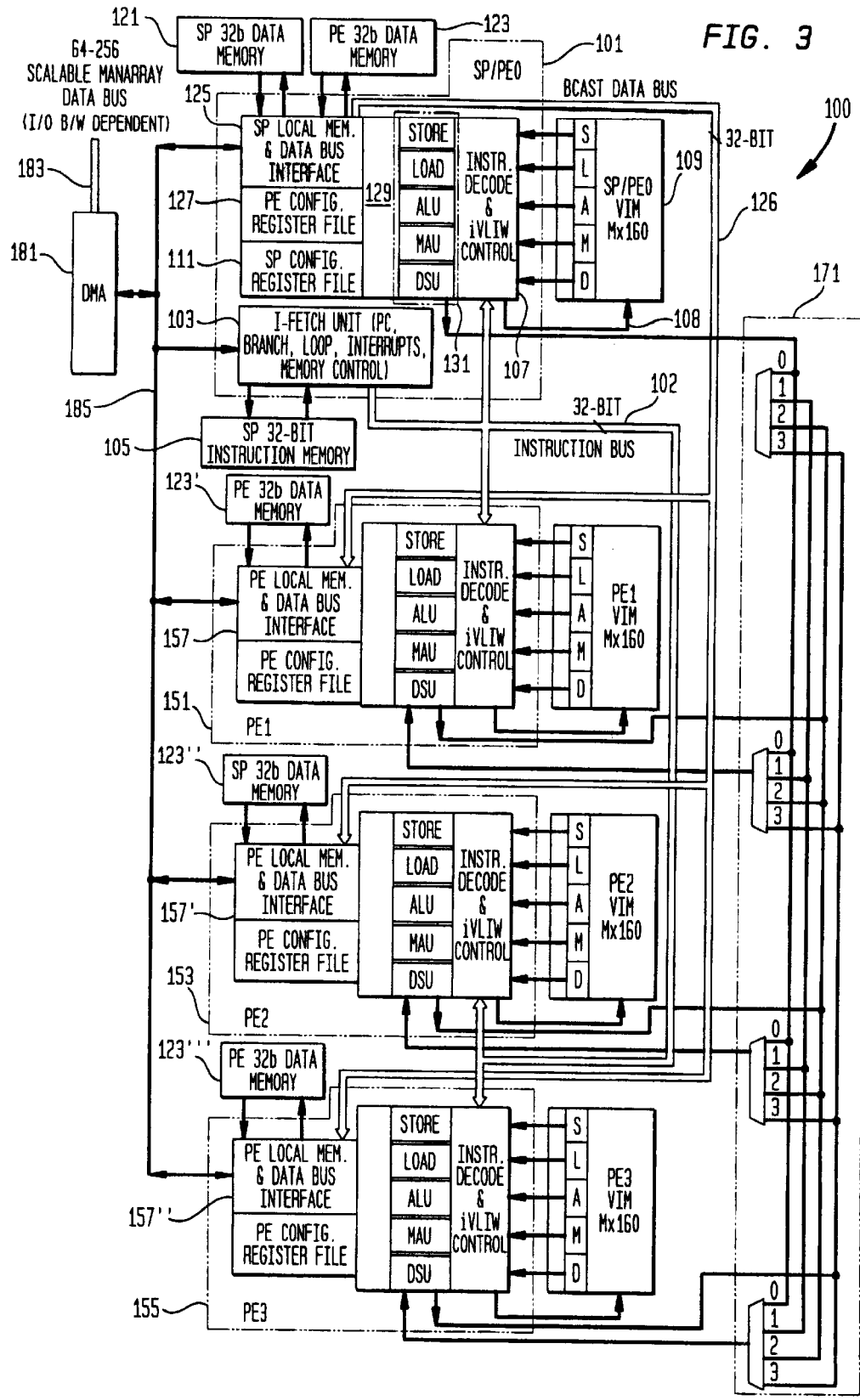
FIG. 3 illustrates a ManArray 2×2 iVLIW processor showing the connections to a plurality of processing elements connected in an array topology for use in conjunction with the present invention.

In a preferred embodiment of the present invention shown in FIG. 3, a ManArray 2×2 iVLIW Single Instruction Multiple Data stream (SIMD) processor 100 containing a controller sequence processor (SP) combined with a processing element-0 (PE0) SP/PE0 101, as covered in more detail in co-pending application Ser. No. 09/169,072 entitled "Methods and Apparatus for Dynamic Merging an Array Controller with an Array Processing Element", and three additional PEs 151, 153, and 155 are utilized to implement the dynamic iVLIW modification techniques of the present invention. The SP/PE0 101 contains a fetch controller 103 to allow the fetching of SIWs from a 32-bit instruction memory 105. The fetch controller 103 provides the typical functions needed in a programmable processor such as a program counter (PC), a branch capability, digital signal processing loop operations, support for interrupts, and also provides the instruction memory control which could include an instruction cache if needed by an application. In addition, the SIW I-Fetch controller 103 dispatches 32-bit SIWs to the other PEs in the system by way of a 32-bit instruction bus 102.

In this exemplary system, common elements are used throughout to simplify the explanation. It will be recognized that further implementations are not limited to this restriction. For example, the execution units 131 in the combined SP/PE0 101 can be separated into a set of execution units optimized for the control function, e.g. fixed point execution units, and the PE0 as well as the other PEs can be optimized for a floating point application. For the purposes of this invention description, it is assumed that the execution units 131 are of the same type in the SP/PE0 and the PEs. In a similar manner SP/PE0 and the other PEs use a five instruction slot iVLIW architecture which contains a VIM memory 109 and an instruction decode and VIM controller function unit 107 which receives instructions as dispatched from the SP/PE0's I-Fetch unit 103 and generates the VIM addresses-and-control signals 108 required to access the iVLIWs, identified by the letters SLAMD in block 109, stored in the VIM. The loading of the iVLIWs is described in more detail in co-pending patent application Ser. No. 09/187,539 filed Nov. 6, 1998 and entitled "Methods and Apparatus for Efficient Synchronous MIMD Operations with iVLIW PE-to-PE Communications". Also contained in the SP/PE0 and the other PEs is a common PE configurable register file 127 which is described in more detail in co-pending patent application Ser. No. 09/169,255 filed Oct. 9, 1998 and entitled "Method and Apparatus for Dynamic Instruction Controlled Reconfiguration Register File with Extended Precision". Due to the combined nature of the SP/PE0 101, the data memory interface controller 125 must handle the data processing needs of both the SP controller, with SP data in memory 121, and PE0, with PE0 data in memory 123. The SP/PE0 controller 125 also is the source of the data that is sent over the 32-bit broadcast data bus 126. The other PEs, 151, 153, and 155 contain common physical data memory units 123', 123'', and 123''' though the data stored in them is generally different as required by the local processing done on each PE. The interface to these PE data memories is also a common design in PEs 1, 2, and 3 and indicated by PE local memory and data bus interface logic 157, 157' and 157''. Interconnecting the PEs for data transfer communications is the cluster switch 171 more completely described in co-pending patent application Ser. No. 08/885,310 filed Jun. 30, 1997 and entitled "Manifold Array Processor", Ser. No. 08/949,122 filed Oct. 10, 1997 and entitled "Methods and Apparatus for Manifold Array Processing", and Ser. No. 09/169,256 filed Oct. 9, 1998 and entitled "Methods and Apparatus for ManArray PE-to-PE Switch Control". The above noted applications are assigned to the assignee of the present invention and incorporated herein by reference in their entirety. The interface to a host processor, other peripheral devices, and/or external memory can be implemented in many ways. The primary mechanism shown for completeness is contained in the DMA control unit 181 that provides a scalable ManArray data bus 183 that connects to devices and interface units external to the ManArray core. The DMA control unit 181 provides the data flow and bus arbitration mechanisms needed for these external devices to interface to the ManArray core memories via bus 185.

Figure 4A:
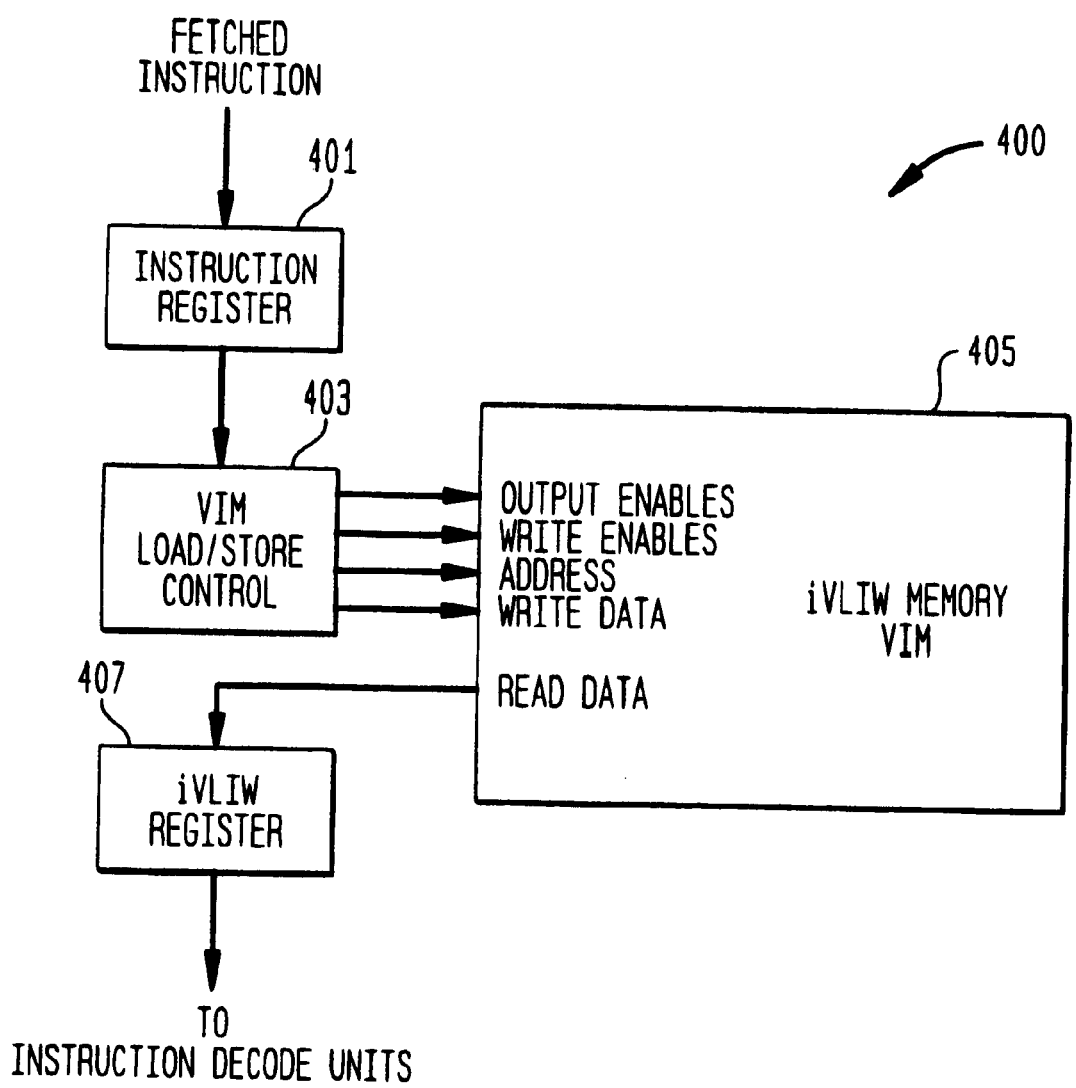
FIG. 4A illustrates an iVLIW data path with a VIM in accordance with a presently preferred embodiment of the present invention.

FIG. 4A shows an overall basic iVLIW data path 400 in which a fetched instruction is stored in an instruction register 401 which is connected to a VIM load and store control function unit 403. The VIM load and store control function provides interface signals to a VIM 405. The output of the VIM 405 is pipelined to an iVLIW register 407.

One presently preferred XV1 instruction 425 is shown in FIG. 4B. XV1 instruction 425 is for 32-bit encoding as seen in encoding block 430 and has a presently preferred syntax/operation shown in syntax/operation block 435 as described further below. The XV1 instruction 425 is one of the control group of instructions defined by the Group field bits 30 and 31 and is used to select VLIWs from VLIW memory (VIM) and execute individual instruction slots of the specified SP or PE, selectable by the SP/PE bit 29. The VIM address is computed as the sum of a base VIM address register Vb (V0 or V1) plus an unsigned 8-bit offset VIMOFFS shown in bits 0–7, the block of bits 431, of encoding block 430 of FIG. 4B. The VIM address must be in the valid range for the hardware configuration otherwise the operation of this instruction is undefined.

Similarly, FIG. 4C shows a presently preferred LV2 instruction 455 for a load/modify VLIW-2 function. An encoding block 450 for 32-bit encoding and syntax/operation block 460 are shown. FIG. 4D shows an XV2 instruction 475 having a 32-bit encoding block 470 and syntax/operation block 480.

Dynamic SP and PE IVLIW Across Slot Compression Operations

Figure 5:
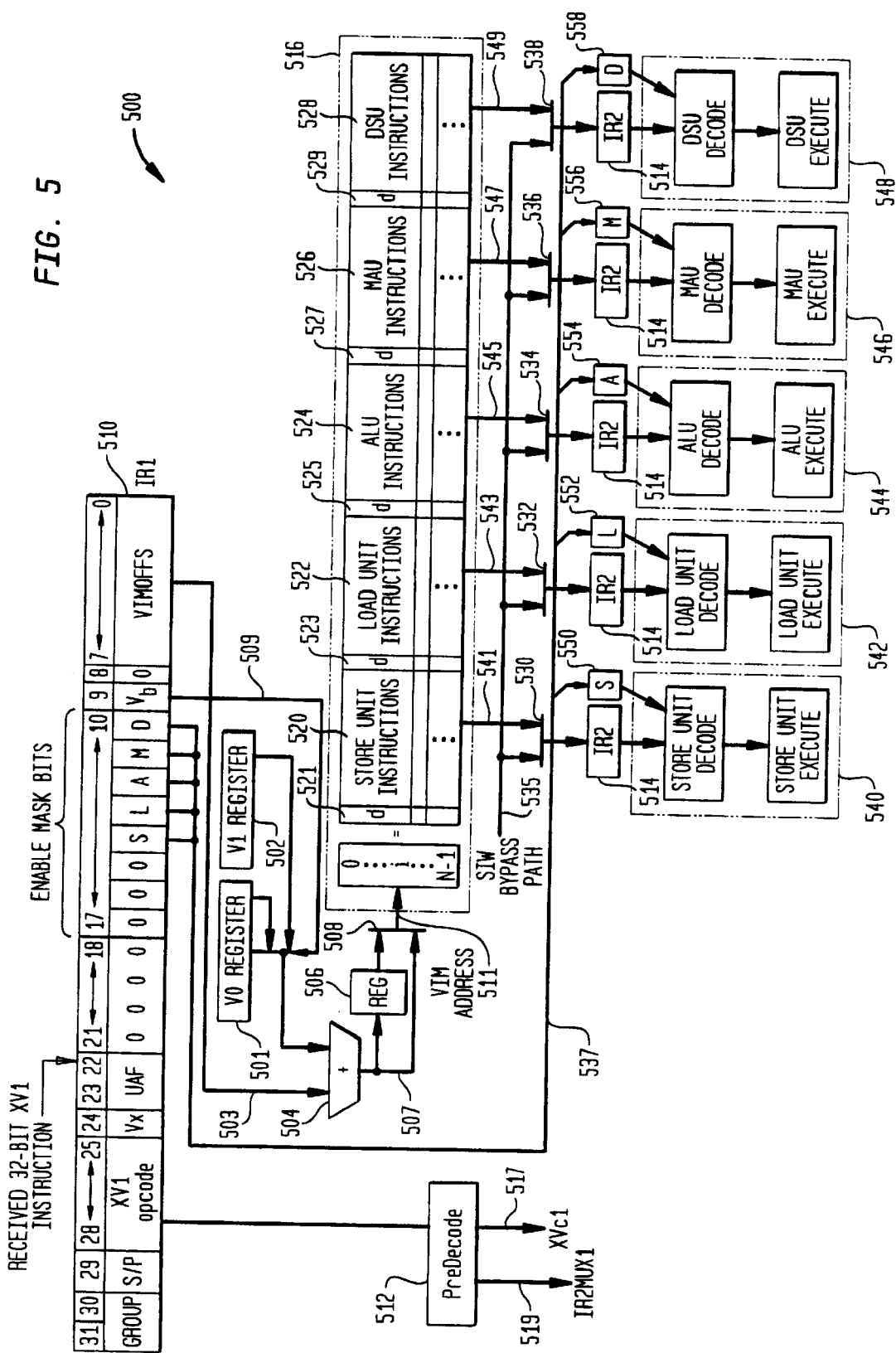
FIG. 5 illustrates aspects of an iVLIW XV1 pipeline with across slot compression utilized with an exemplary XV1 instruction format in accordance with the present invention.

The XV1 instruction is advantageously used to modify, enable/disable sub-iVLIW instructions, and indirectly execute iVLIW instructions in the SP and the PEs. The iVLIWs have been loaded into VIM by use of the LV instruction, also referred to as LV1 elsewhere in this application, which is described in more detail in previously mentioned co-pending application Ser. No. 09/187,539. As illustrated in FIG. 5, each VIM 516 entry preferably consists of five SIW slots (one per execution unit) and associated with each SIW slot are additional state bits, of which only 5 are shown (one d-bit per slot). Included among the five execution units are a store unit 540 associated with VIM 516 store instruction slot 520, load unit 542 associated with load instruction slot 522, an arithmetic-logical unit (ALU) 544 associated with ALU instruction slot 524, a multiply-accumulate unit (MAU) 546 associated with an MAU instruction slot 526, and a data-select unit (DSU) 548 associated with a DSU instruction slot 528.

The five state d-bits 521, 523, 525, 527, and 529 are LV-loaded-disable bits for the instruction slots that indicate either: the SIW slot is available-for-execution or it is not-available-for-execution. A binary value suffices to distinguish between the two states. An instruction slot with its d-bit set to the not-available-for-execution state is interpreted as an NOP (no-operation) instruction by the execution unit. In addition, the appropriate d-bit for that functional slot position is loaded into bit-31 of that slot. Alternatively, the d-bits may be grouped and stored in a different location within a VIM address line while still maintaining the relationship between a d-bit and its associated execution unit and instruction slot within the iVLIW.

FIG. 5 illustrates an iVLIW XV1 pipeline 500, in which a received XV1 instruction is loaded into an instruction register 1 (IR1) 510. The output of IR1 is pre-decoded 512 early in the pipeline cycle prior to loading the VLIW Instruction Register 2 values (IR2) 514. Upon receipt of an XV1 instruction in IR1 510, the VIM address 511 is calculated by use of the specified Vb registers, 501 or 502, as selected by the Vb signal 509 sourced from IR1 510 bit-9, and added by adder 504 to the offset value included in the XV1 instruction via path 503. It is noted that by using bit-8 and bit-9 together up to 4 Vb registers can be specified. The resulting VIM address 507 is passed through multiplexer 508 to address the VIM 516. The iVLIW at the specified address is read out of the VIM 516 and passes through the multiplexers 530, 532, 534, 536, and 538, to the IR2 registers 514. As an alternative to minimize the read VIM 516 access timing critical path, the output of VIM 516 can be latched into a register whose output is passed through a multiplexer prior to the decode state logic. The enable mask bits, bits 10–17 of the XV1 instruction stored in IR1 510, are distributed via path 537 to bit storage latches, S bit-14 to S latch 550, L bit-13 to L latch 552, A bit-12 to A latch 554, M bit-11 to M latch 556, and D bit-10 to D latch 558.

These enable-mask-bits override the d-bit available-for-execution setting for each instruction slot for the XV execution cycle. In more detail, the Load VLIW-1 (LV1) instruction causes the d-bit setting to be loaded into each VIM slot. The d-bit per execution unit slot represents the enabled or disabled status of the slot position. An inactive state of this bit, for example a "0", represents the disabled state and the active state of this bit, for example a "1", represents the enabled state. If the d-bit in a slot is enabled, it may be over-ridden by the XV1 mask enable bit appropriate for that slot, if the d-bit in a slot is disabled, it can not be overridden by the XV1 mask enable bit appropriate for that slot. In other words, a slot disabled by a LV1 instruction can not be reenabled by an XV1 instruction. Conversely, a slot enabled by a LV1 instruction can be disabled or kept enabled by an XV1 instruction. The simple logic to accomplish this is located in each functional unit. This capability is required for the functionality described herein and to efficiently support synchronous MIMD operations as described in more detail in co-pending application Ser. No. 09/187,539 filed Nov. 6, 1998. Alternatively, the latches 550–558 can be avoided if the timing path allows the override logic to be placed at the output of the VIM prior to IR2 clocking. In either case, the functional unit's decode and execute logic 540–548 either executes all instructions received from VIM or executes an NOP based upon the setting of the d-bits and the mask enable bits. For the XV1 execution, the IR2MUX1 control signal 519 in conjunction with the pre-decode XVc1 control signal 517 cause all the IR2 multiplexers, 530, 532, 534, 536, and 538, to select the VIM output paths, 541, 543, 545, 547, and 549. The mask enable bits are present at their latch inputs. At the end of the pre-decode cycle, the VLIW IR2 514 and the mask enable bit latches are clocked and their outputs become present at the inputs of the functional units. At this point, the five individual decode and execution stages of the pipeline, 540, 542, 544, 546, and 548, are completed, executing the instruction or an NOP, in synchrony providing the iVLIW parallel execution performance. To allow a non-XV single 32-bit functional instruction to execute by itself in the PE or SP, the bypass VIM path 535 is shown. For example, when a simplex ADD instruction is received into IR1 510 for parallel array execution, the pre-decode function unit 512 generates the IR2MUX1 519 control signal, which in conjunction with an ADD instruction pre-decode signal, causes the ALU multiplexer 534 to select the bypass path 535. Since in this case there is no XV instruction in execution, the enable-mask-bits are ignored by the functional unit logic.

Any combination of individual instruction slots may be executed via the execute slot parameter 'E={SLAMD}', where S=Store Unit (SU), L=Load Unit (LU), A=Arithmetic Logic Unit (ALU), M=Multiply-Accumulate Unit (MAU), and D=Data Select Unit (DSU). A blank 'E=' parameter does not execute any slots. The Vx bit-24 specifies if this XV1 overrides the LV UAF setting. Vx=0 means do not override LV UAF setting and Vx=1 means override the LV UAF setting with the one specified in this XV1's UAF field bits 22 and 23. The Unit Affecting Flags (UAF) parameter 'F=[AMDN]' overrides the UAF specified for the VLIW when it was loaded via the LV instruction. The override selects which arithmetic instruction slot (A=ALU, M=MAU, D=DSU) or none (N=NONE) is allowed to set condition flags for this execution of the VLIW. The override does not affect the UAF setting specified via the LV instruction. A blank 'F=' selects the UAF specified when the VLIW was loaded.

Condition Flags are set by the individual simplex instruction in the slot specified by the setting of 'F=' parameter from the original LV instruction or as overridden by a 'F=[AMD]' parameter in the XV1 instruction. Condition flags are not affected when 'F=N'.

The XV1 operation takes one execute cycle to complete, though pipeline considerations must be taken into account based upon the individual simplex instructions in each of the slots that are executed.

Overall operation of the present invention may be better understood by examining its application to the exemplary problem presented in the discussion of the prior art. In the table 600 of FIG. 6, each row represents an iVLIW. Each unique VIM address 610 is identified with a number in the first column. The boxed table entries represent SIWs that are masked (i.e. disabled) by the XV1 instruction during execution. In table 600 of FIG. 6, the shaded iVLIWs 612, 614, 616 and 618 at VIM address-0 highlight four occasions in which the SIWs stored at VIM address-0 are invoked by the XV1 instruction, each time with a different mask. The first time the instructions are invoked, only the Load Unit is allowed to execute and the Multiply-Accumulate and the Store Units are masked out by the XV1 instruction. The second time the VIM address-0 iVLIW instructions are invoked, the Load and Multiply-Accumulate Units are allowed to execute and the Store Unit is masked out by the XV1 instruction. The third time, all three units are allowed to execute. Finally, the fourth time the instructions stored in address-0 iVLIW are invoked, only the Store Unit is allowed to execute and the Load and Multiply-Accumulate Units are masked out. In the 2×2 ManArray 100 of FIG. 3, four independent vector * matrix operations, on independent local PE data stored in each PEs local data memories, will be occurring in parallel and in synchronism while maintaining a single thread of control with the dispatching of the 32-bit XV1 instructions to each PE. The iVLIWs identified in this example are the same in each PE with the operands accessed from each PE's local register file and local data memory.

Figure 7:
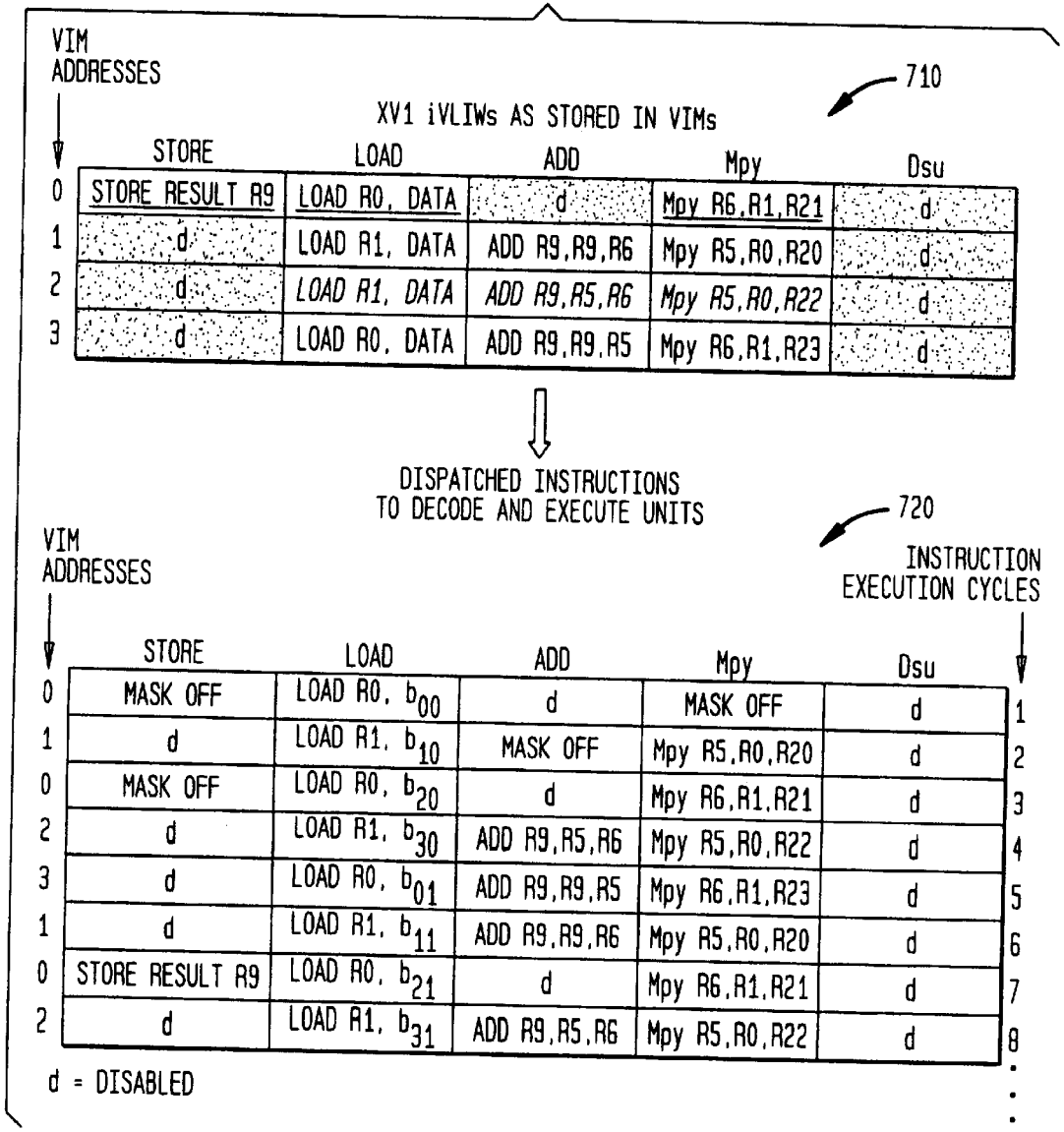
FIG. 7 illustrates dynamic cycle-by-cycle iVLIW instruction selection across instruction slots for execution time parallelism.

FIG. 7 illustrates the FIG. 6 example's four iVLIWs as stored in VIM addresses 0–3 710 and the cycle-by-cycle dispatched instruction sequence 720 to the decode-and-execution units. The dispatched instruction sequence 720 illustrates the reuse and cycle-by-cycle redefinition of the iVLIWs that are executed in parallel at execution time. This redefinition is a selecting of the SIWs stored in an iVLIW at a specific VIM address. For example, iVLIW-0 is shown used in instruction execution cycles 1, 3, and 7 with different groupings of the iVLIW-0's SIWs. In cycle-1, only the Load unit instruction is used. In cycle-3 the Load and MAU units are used and in cycle-7, the Store, Load, and MAU units are used. FIG. 7 illustrates how the present invention accomplishes a significant saving in the number of unique VLIW memory entries required by a program, by effectively "packing" several VLIW operations into a single VLIW memory entry. Thus, with the present invention, multiple programs can share a single VLIW memory entry, by storing multiple iVLIWs at the same VIM address. The example also demonstrates the use of the invention to build up and tear down software pipelines. Furthermore, the size of the iVLIW memory in a parallel processor can be kept from becoming prohibitively expensive to build. FIG. 7A illustrates exemplary program code 730 using the XV1 instruction to accomplish the vector* matrix multiplication of FIG. 1 on the 2×2 ManArray 100 of FIG. 3.

Dynamic SP and PE IVLIW Within Slot Compression Operations

For the within slot compression mechanism, the VIM is divided up into separate VIM sections each associated with the functional decode-and-execute units. Each of the VIMs' address maps are divided into multiple 4-bit addressable sections as governed by the offset field included in a second version of the execute iVLIW instruction, XV2, with a separate offset that can be specified for each VIM slot section. This VIM configuration and XV2 addressing option provide the ability to independently select instructions within each VIM slot 4-bit address range. By providing this ability, duplicate SIWs within the 16 addressable iVLIW range can be eliminated providing greater packing of SIWs within the composite VIM. Of course, many variations of addressing options can be envisioned utilizing the inventive techniques to allow the independent selection of SIWs within a partitioned VIM but one is described further below to illustrate various aspects of the within-slot-compression in accordance with the present invention.

The XV2 instruction is similar to the XV1 instruction in that it is used to modify, enable/disable sub-iVLIW instructions, and indirectly execute iVLIW instructions in the SP and PEs. It does so, however, in a different way than the XV1 instruction. For the XV2 instruction, it is still assumed that the iVLIWs have been loaded into this new partitioned VIM by use of a new version of the Load VLIW instruction, LV2 455 shown in FIG. 4C. The LV2 encoding block 450 consists of a CtrlOp field, bits 25–28, that represent the LV2 instruction opcode, a load instruction bit-23 that specifies if at least one instruction is to be loaded or if only the disable d-bit for the specified address is to be loaded. Bit-22 is the disable d-bit that is loaded. Bits 18–21 specify that up to 16 instructions are to be loaded in the specified functional unit's VIM, bits 15–17, beginning at the address specified by the Vb register address, bit-9, plus the VIMOFFS offset address, bits 0–7. The syntax/operation details are shown in block 460. The XV2 instruction 475 is shown in FIG. 4D. The encoding format is shown in encoding block 470 with new bit fields as follows. The UAF field bits 23 and 24 are not optional on XV2 and must be specified with each XV2 use. The VIM base register selection Vb is bit 20 and the five offset fields are Store VIM offset (SOFS) bits 16–19, Load VIM offset (LOFS) bits 12–15, ALU VIM offset (AOFS) bits 8–11, MAU VIM offset (MOFS) bits 4–7, and DSU VIM offset (DOFS) bits 0–3. The syntax/operation is shown in block 480.

Figure 8:
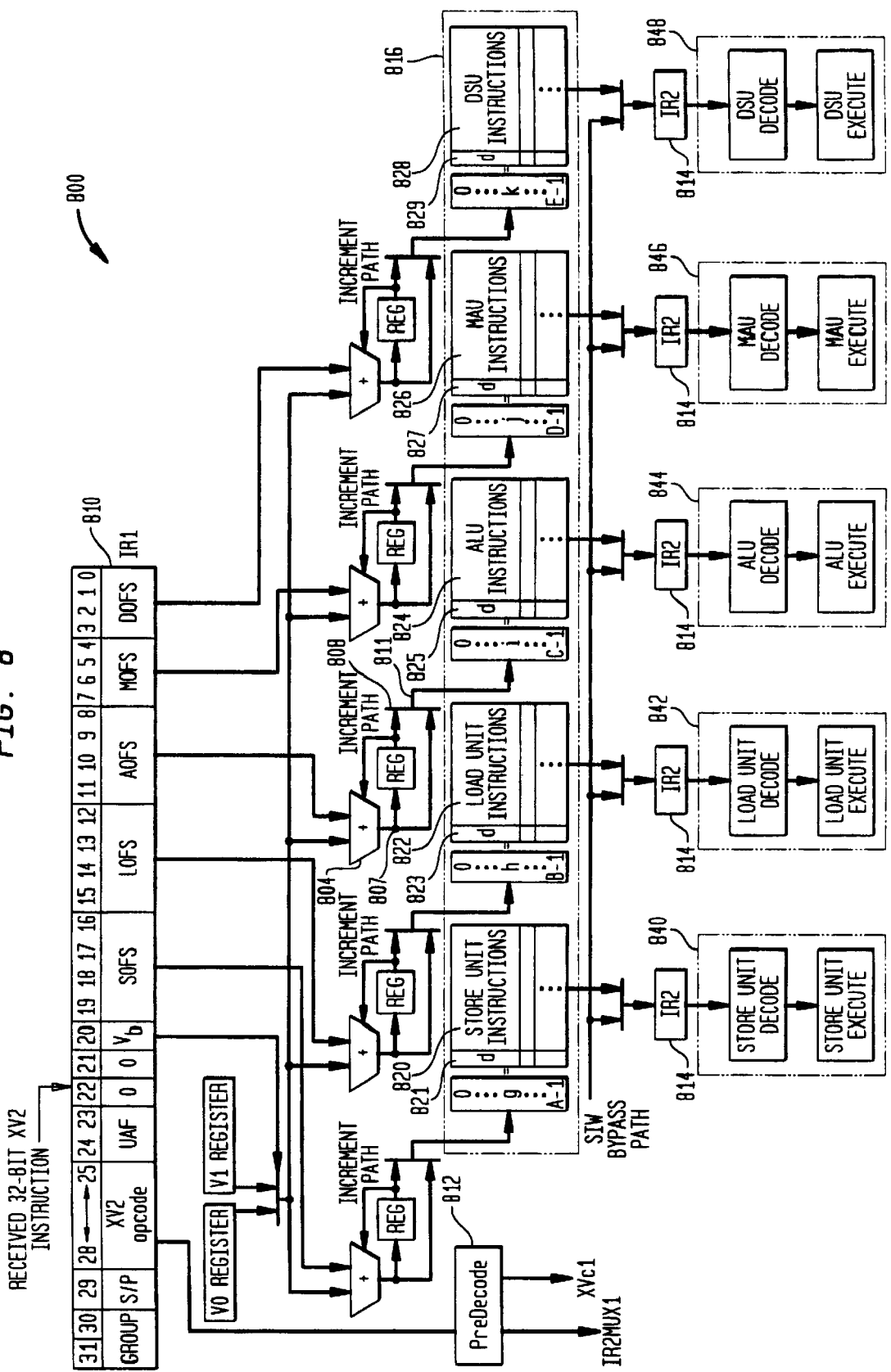
FIG. 8 illustrates aspects of an iVLIW XV2 pipeline with within slot compression utilizing an exemplary XV2 instruction format in accordance with the present invention.

Referring to FIG. 8 which illustrates aspects of an iVLIW XV2 pipeline 800, VIM 816 consists of multiple independent memory units each associated with their functional decode and execute units. Independent addressing logic is provided for each slot VIM. As illustrated in FIG. 8 each VIM entry preferably consists of five SIW slots (one per execution unit) and associated with each SIW slot are additional state bits, of which 5 are shown (one d-bit per slot). Included among the five execution units are a store unit 840 associated with store instruction VIM 820, load unit 842 associated with load instruction VIM 822, an arithmetic-logical unit (ALU) 844 associated with an ALU instruction VIM 824, a multiply-accumulate unit (MAU) 846 associated with MAU instruction VIM 826, and a data-select unit (DSU) 848 associated with DSU instruction VIM 828.

The FIG. 8 VIM address adder functional blocks, as exemplified by ALU VIM address adder 804, are different than the adder functional block 504 of FIG. 5 in order to support the VIM address increment capability required by the Load VLIW-2 (LV2) Instruction of FIG. 4C as described in Syntax/Operation block 460. This capability allows the instructions following the LV2 instruction to be loaded at:

(V[01]+VIMOFFS)[UnitVIM]←$1^{st}$ Instruction following LV2

(V[01]+VIMOFFS+1)[UnitVIM]←$2^{nd}$ Instruction following LV2

(V[01]+VIMOFFS)+InstrCnt)[UnitVIM]←$1^{st}$ (InstrCnt)$^{th}$ Instruction following LV2

The instruction count InstrCnt is a binary coded number, 0 thru F, that represents from 1 to 16 instructions thta can be loaded into up to 16 consecutive UnitVIM locations.

The five state d-bits 821, 823, 825, 827, and 829 are LV-loaded disable bits for the instruction slots that indicate either: the SIW slot is available-for-execution or it is not-available-for-execution. A binary value suffices to distinguish between the two states. An instruction slot with its d-bit set to the not-available-for-execution state is interpreted as an NOP (no-operation) instruction by the execution unit. In addition, the appropriate d-bit for that functional slot position is loaded into bit-31 of that slot.

The operation of the iVLIW XV2 pipeline 800 is as follows. A received XV2 instruction is loaded into instruction register 1 (IR1) 810. The output of IR1 is pre-decoded by pre-decode function unit 812 early in the pipeline cycle prior to loading the VLIW instruction register 2 values in IR2 814. Upon receipt of an XV2 instruction in IR1 810, multiple VIM addresses are calculated in parallel. The calculations differ for each VIM slot section due to each having its own offset value as set by the XV2 instruction. Each Vim slot calculation is of the form Vb+0extend{unitOFS[4]} where Vb represents one of two VIM address registers, and 0extend aligns the 4-bit (unitOFS[4]) value with the extent of Vb. For example, the ALU VIM's address 811 is calculated by Vb+0extend{AOFS[4]}, where the Vb value is sourced from either V0 or V1 as selected by the Vb field, bit-20, of IR1. Addition is accomplished by adder 804. The AOFS[4]= IR1 bits8–11 are connected to adder 804 with the adder 804 output 807 being passed through multiplexer 808 to create the ALU VIM slot address 811. The zero extend logic is not shown for clarity. The ability to mask an entry with XV2 can be achieved without the use of the enable mask bits that were described in connection with the discussion of XV1 operation. If a programmer desires the ability to mask an entry, he or she must plan for it in advance and ensure that within the group of 16 addresses, provided by the offset field, at least one of the SIWs is marked as disabled by use of the disable d-bit. For the particular iVLIW that is to be executed with a specific slot masked off, the unitOFS offset for that unit's VIM is used to select the disabled SIW previously stored. If no slots need to be disabled, full use of the 16 addresses are available for "enabled" SIWs. If only one slot is desired to be disabled, only that slot's VIM need contain the disabled instruction. Once the VIM addresses are selected, the appropriate SIWs are read out and sent to their decode and execution units. Since in XV2 operation there is no need for the enable-mask-bits, there are no additional state bit latches required for input to the decode and execution units. Another difference between XV1 and the XV2 operation is that for XV2, the UAF field is always selected. The XV2 operation takes one execute cycle to complete, though pipeline considerations must be taken into account based upon the individual simplex instructions in each of the slots that are executed.

The present invention may be better understood by examining the application of the XV2 instruction to the exemplary problem in the discussion of the prior art. FIG. 9 illustrates the iVLIWs required using the XV2 approach. Each decode and execution unit is associated with its own VIM each with different storage requirements for iVLIW usage. This is also depicted in FIG. 8 wherein a different address range per functional unit VIM is shown; (0-(A-1)) store VIM 820, (0-(B-1)) load VIM 822, (0-(C-1)) ALU VIM 824, (0-(D-1)) MAU VIM 826, and (0-(E-1)) DSU VIM 828. In FIG. 9, composite VIM 910 shows the five decode and execution units' VIMs. The storage requirements for this composite VIM 910 are as follows: the Store VIM requires only 2 locations, the Load VIM uses 3 locations, the ALU VIM uses 4 locations, the MAU VIM uses 5 locations, and the DSU VIM only needs one location. Only one set of disabled locations are used in each VIM which is shown by convention to be in VIM address 0 in each of the unit's VIMs. Dispatched instruction sequence 920 illustrates the reuse and cycle-by-cycle redefinition of the iVLIWs that are executed in parallel at execution time. This redefinition is a selecting of the SIWs stored in the units VIMs, but not all at the same VIM address as is done with XV1. For example, in instruction execution cycle-4 of sequence 920 the store SIW is accessed from address 0 in the Store VIM, a disabled d-bit instruction, the Load SIW is accessed from address 2 in the Load VIM, a Load R1, Data instruction, the ALU SIW is accessed from address 3 in the ALU VIM, an Add R9,R5,R6 instruction, the MAU SIW is accessed from address 3 in the MAU VIM, a Mpy R5,R0, R22 instruction, and the DSU SIW is accessed from address 0 in the DSU VIM, a disabled d-bit instruction. FIG. 10 illustrates program code 1000 for using XV2 instructions to accomplish the vector * matrix multiplication of FIG. 1 on the 2×2 ManArray 100 of FIG. 3. Specifically, in the 2×2 ManArray of FIG. 3, four independent vector * matrix operations, on independent local PE data stored in each PE's local data memories, will be occurring in parallel and in synchronism while maintaining a single thread of control with the dispatching of the 32-bit XV2 instructions to each PE. The iVLIWs identified in this exemplary description are the same in each PE with the operands accessed from each PE's local register file and local data memory.

In comparing the XV2 approach with the XV1 approach, it is observed that only 15 locations are used in the composite VIM 910 of the XV2 approach illustrated in FIG. 9 and 20 locations are used in the VIM 710 of the XV1 approach illustrated in FIG. 7. Both approaches are significantly better than the prior art in their utilization of VLIW memory storage. Typically, 35 locations would have been required in a five slot VLIW prior art system. It is also noted that for cost sensitive applications, the XV2 approach allows each functional unit's VIM to be cost optimized to the application.

While the present invention has been disclosed in the context of presently preferred methods and apparatus for carrying out the invention, various alternative implementations and variations will be readily apparent to those of ordinary skill in the art.

We claim:

1. A processing apparatus comprising:
a very long instruction word (VLIW) memory (VIM) for storing VLIWs in VIM entries, each VIM entry identified by an address and comprising a plurality of slots; and
at least one address generator including a base address register storing a base address, said at least one address generator operating to receive address offset values from an execute VLIW instruction and to generate addresses corresponding to the VIM entries by performing calculations utilizing the base address and the address offset values.

2. The processing apparatus of claim 1 further comprising a plurality of execution units communicatively connected to the VIM, and wherein each slot is associated with one of the execution units.

3. The processing apparatus of claim 2 wherein each of the address offset values received from the execute VLIW instruction correspond to a different execution unit.

4. The processing apparatus of claim 2 wherein each execution unit is operable for executing the VLIW contained in the associated slot of the VIM entry identified by the address generated by the address generation unit.

5. The processing apparatus of claim 2 wherein each VLIW comprises a plurality of short instruction words (SIWs) stored in the slots, and wherein each execution unit is operable for executing one of the short instruction words stored in the associated slot of the VIM entry identified by the address generation unit.

6. The processing apparatus of claim 5 further comprising a state bit associated with each slot of each VIM entry which indicates to one of the execution units if the SIW contained in the slot is available for execution.

7. The processing apparatus of claim 6 wherein each execution unit is operable to receive an override bit which indicates to the execution units if the state bit for the SIW should be overridden.

8. The processing apparatus of claim 1 wherein the calculations include an addition of the base address and the address offset values.

9. The processing apparatus of claim 1 wherein the processing apparatus comprises a first address generator for a first slot and a second address generator for a second slot, wherein the execute VLIW instruction provides a first address offset value to the first address generator and a second address offset value to the second address generator, and wherein the first address offset value does not equal the second address offset value.

10. The processing apparatus of claim 1 wherein the at least one address generator calculates multiple addresses in parallel.

11. The processing apparatus of claim 1 wherein the at least one address generator calculates an address for each slot comprising an instruction to be executed.

12. A processing apparatus comprising:
a very long instruction word (VLIW) memory (VIM) for storing VLIWs in VIM entries, each VIM entry identified by an address, each VLIW including a plurality of short instruction words (SIWs), each VIM entry including a plurality of slots, each slot containing an SIW;
at least one address generation unit including a plurality of base address registers containing base addresses, said address generation unit for receiving a base address register indicator and an offset value for each slot from an execute VLIW instruction, said base address register indicator specifying one of the base address registers, said at least one address generation unit generating addresses corresponding to the VIM entries by performing calculations utilizing the offset values and a base address contained in the base address register specified by the base address register indicator.

13. The processing apparatus of claim 12 further comprising a plurality of execution units communicatively connected to the VIM, and wherein each slot is associated with one of the execution units.

14. The processing apparatus of claim 13 wherein each of the address offset values received from the execute VLIW instruction correspond to a different execution unit.

15. The processing apparatus of claim 13 wherein each execution unit is operable for executing the VLIW contained in the associated slot of the VIM entry identified by the address generated by the address generation unit.

16. The processing apparatus of claim 13 wherein each VLIW comprises a plurality of short instruction words (SIWs) stored in the slots, and wherein each execution unit is operable for executing one of the short instruction words stored in the associated slot of the VIM entry identified by the address generation unit.

17. The processing apparatus of claim 16 further comprising a state bit associated with each slot of each VIM entry which indicates to one of the execution units if the SIW contained in the slot is available for execution.

18. The processing apparatus of claim 17 wherein each execution unit is operable to receive an override bit which indicates to the execution units if the state bit for the SIW should be overridden.

19. The processing apparatus of claim 12 wherein the calculations include an addition of the base address and the address offset values.

20. The processing apparatus of claim 12 wherein the processing apparatus comprises a first address generator for a first slot and a second address generator for a second slot, wherein the execute VLIW instruction provides a first address offset value to the first address generator and a second address offset value to the second address generator, and wherein the first address offset value does not equal the second address offset value.

21. The processing apparatus of claim 12 wherein the at least one address generator calculates multiple addresses in parallel.

22. The processing apparatus of claim 12 wherein the at least one address generator calculates an address for each slot comprising an instruction to be executed.

23. A processing apparatus comprising:
a very long instruction word (VLIW) memory (VIM) for storing VLIWs in VIM entries, each VIM entry identified by an address;
a plurality of execution units communicatively connected to the VIM; and
an address generation unit for each of the execution units, each address generation unit receiving an offset value from an execute VLIW instruction and generating an address corresponding to one of the VIM entries utilizing the offset value and a base address contained in a base address register,
wherein the execute VLIW instruction comprises a different offset value for each address generation unit.

24. A very long instruction word (VLIW) processing method for a processing apparatus comprising a VLIW-memory (VIM) for storing VLIWs in VIM entries identified by addresses, the method comprising:
receiving a first offset value from an execute VLIW instruction by a first address generation unit associated with a first execution unit;
receiving a second offset value from the execute VLIW instruction by a second address generation unit associated with a second execution unit;
reading a base address from a base address register by the first address generation unit and the second address generation unit;
generating a first VIM address by adding the base address and the first offset value, by the first address generation unit;
generating a second VIM address by adding the base address and the second offset value, by the second address generation unit;
reading a first instruction from a first slot of a VIM entry corresponding to the first VIM address;
reading a second instruction from a second slot of a VIM entry corresponding to the second VIM address;
executing first instruction by the first execution unit; and
executing the second instruction by the second execution unit.

25. The method of claim 24 wherein the first VIM address does not equal the second VIM address.

26. A very long instruction word (VLIW) processing method for a processing apparatus comprising a VLIW memory (VIM) for storing VLIWs in VIM entries identified by addresses, a plurality of execution units, and at least one of address generation unit, the method comprising the steps of:
receiving at least one offset value from an execute VLIW instruction, by the at least one address generation unit;
receiving a base address indicator from the execute VLIW instruction by the at least one address generation unit;
determining a base address register from the base address indicator;
reading a base address from the base address register, by the at least one address generation unit; and
generating at least one address corresponding to at least one of the VIM entries, by adding the base address and each of the at least one offset values, by the address generation units.

27. The method of claim 26 further comprising:
reading instructions from the VIM entries corresponding to the addresses; and
executing the instructions by the execution units.

* * * * *